UNITED STATES PATENT OFFICE.

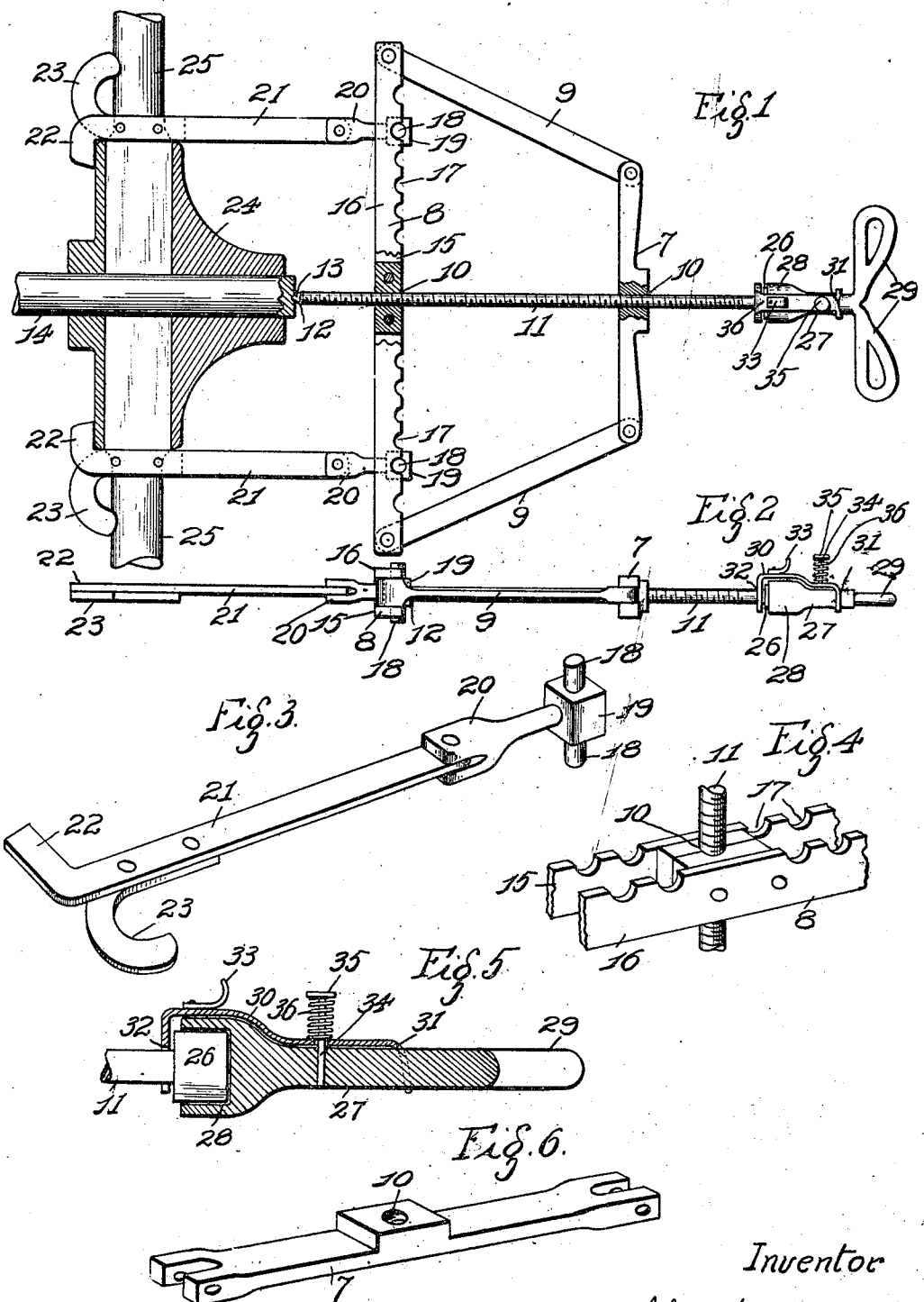

ALFRED B. JONES, OF FARMINGTON, MISSOURI.

WHEEL PULLER.

1,415,451. Specification of Letters Patent. Patented May 9, 1922.

Application filed August 23, 1920. Serial No. 405,532.

*To all whom it may concern:*

Be it known that I, ALFRED B. JONES, a citizen of the United States, and resident of Farmington, Missouri, have invented certain new and useful Improvements in a Wheel Puller, of which the following is a specification.

This invention relates to improvements in a wheel puller, and has for its object a mechanism which can be properly adjusted so as to be applied to any hub of a wheel, to the spokes thereof or to the surface of a gear or pulley and a screw mechanism brought in contact with the end of a shaft on which the wheel is mounted so that by manipulating the screw it will cause a pulling action on the wheel and remove it evenly from the shaft.

A further object of my invention is to provide a means which is adjustably constructed so that the same may be adaptable for the removing of wheels, gears or pulleys from the shaft of any desirable size. The pulling arms which contact with the wheel are supported on the swivel so that they may be adjusted and fitted against a straight or angular surface depending upon the shaft and construction of the wheel.

Figure 1, is an elevation of my invention with parts broken away and in section showing the same applied to the hub of a wheel for pulling the same off of the shaft.

Fig. 2, is an edge view of my improved puller.

Fig. 3, is a detail perspective view of one of the swivel pulling arms made use of.

Fig. 4, is a detail perspective view of a portion of the rack in which the pulling arms are supported.

Fig. 5, is a sectional view of the handle made use of showing its application to the end of the operating screw.

Fig. 6, is a detail perspective view of the upper cross bar made use of in connection with my invention.

In the general construction of my invention I provide a wheel puller consisting of a cross bar 7 and a rack bar 8, the same suitably spaced apart and on the ends of both bars are connected connecting arms 9; the center portion of the bars 7 and 8 are provided with internally screw threaded bores 10 which are to receive the operating screw 11; the free end 12 of the screw is pointed as indicated by the numeral 13 and is arranged to fit into a counter punch indentation formed in the center of the end of the shaft 14 and by means of this indentation the screw 11 is held central and in proper alignment with the shaft.

The rack 8 is preferably constructed of two members 15 and 16, the upper edge provided at suitable intervals apart with depressions 17 in which are adapted to be seated the trunnions 18 formed on the block 19 to which is swivelly mounted the bifurcated head 20, the block 19 being of such width as to be freely inserted between the members 15 and 16 so as to permit the proper adjustment of the block on the rack in order to bring the same in alignment with the periphery of the hub.

Between the bifurcations of the head 20 is connected the pulling arm 21, its contact end being provided with a right angular extension 22 and a curved or hooked extension 23. The right angular extension being designed to fit over the edge of a hub, flange portion or gear wheel and the curved or hooked end 23 designed to be placed around the spokes of the wheel when it is desired to pull the wheel by bringing pressure against the spokes, and by means of the swivel connection either one of the pulling ends can be adjusted in position without changing the position of the block in the rack.

The application for pulling off an ordinary automobile wheel is shown in Fig. 1. In this instance 24 indicates the hub of an automobile wheel and 25 the spokes thereof, and when the device is applied as shown, by turning the screw 11 it causes a pulling movement on the bars 7 and 8, drawing with it the pulling arms, which naturally removes the hub from the shaft 14.

On the end of the screw 11 is provided a head 26. This may be either square, hexagon or other shape, and on this is applied the handle 27 which is provided with a socket 28 which is arranged to fit over the head 26 and its end radiating into winds 29 by which the handle may be turned by both hands.

In order to keep the handle intact with the screw and to prevent the same from becoming lost or disconnected from the screw, I place on the handle a latch 30, its one end 31 straddling the shank of the handle, the opposite end being turned down over the front surface of the socket, the same being forked as indicated by the numeral 32, straddling the screw 11. On the top is a finger clip 33 with which the operator places his finger for raising the latch when it is desired to remove the handle from the screw and in order to keep the latch in contact I place on the handle a pin 34 provided with a head 35 and over the pin and between the head and the latch is a spring 36.

The essential feature of this invention is the construction of a device which can be readily and easily applied as well as to be fitted to any size wheel, therefore making it unnecessary to construct various sizes of pullers for various size wheels.

Having fully described my invention what I claim is:

A wheel puller of the character described comprising a rack bar, and a cross-bar, the connecting arms connecting both ends of said bars, a screw threaded member passing through said bars, a detachable handle mounted on the free end of the screw threaded member, the opposite end of the screw threaded member designed to contact with the end of the shaft on which the wheel is mounted, and pulling arms supported by the rack bar, its opposite ends adapted to contact with the hub or spokes of the wheel, substantially as specified.

In testimony whereof, I have signed my named to this specification, in presence of two subscribing witnesses.

ALFRED B. JONES.

Witnesses:
OSCAR L. HAILE,
RUTH GARNER.